US012657121B1

(12) United States Patent
Von et al.

(10) Patent No.: US 12,657,121 B1
(45) Date of Patent: Jun. 16, 2026

(54) REDUCED PIN COUNT STACKABLE MEMORY

(71) Applicant: Raytheon Company, Arlington, VA (US)

(72) Inventors: Adam C. Von, San Gabriel, CA (US); Eric R. Schneider, North Andover, MA (US)

(73) Assignee: Raytheon Company, Arlington, VA (US)

( * ) Notice: Subject to any disclaimer, the term of this patent is extended or adjusted under 35 U.S.C. 154(b) by 0 days.

(21) Appl. No.: 18/981,032

(22) Filed: Dec. 13, 2024

(51) Int. Cl.
G06F 12/02 (2006.01)

(52) U.S. Cl.
CPC ................................ G06F 12/0223 (2013.01)

(58) Field of Classification Search
CPC .................................................. G06F 12/0223
See application file for complete search history.

(56) References Cited

U.S. PATENT DOCUMENTS

| 9,432,298 | B1 | 8/2016 | Smith |
| 2009/0089530 | A1* | 4/2009 | Bodnar .................... G11C 8/06 |
| | | | 711/E12.001 |
| 2024/0193108 | A1 | 6/2024 | Ware et al. |

* cited by examiner

*Primary Examiner* — Jae U Yu
(74) *Attorney, Agent, or Firm* — Schwegman Lundberg & Woessner, P.A.

(57) ABSTRACT

Discussed herein are devices, systems, machine-readable media, and methods for reduced pin count stackable memory. A stackable memory device includes a first surface with a set of input pins, the set of input pins configured to receive chip select signals from an address decoder of a controller; a second surface with a set of output pins, the set of output pins arranged in a similar configuration to the set of input pins to enable coupling and stacking of multiple stackable memory devices; and a cascade routing signal scheme including: a set of dedicated point-to-point signal paths configured to shift the chip select signals from the set of input pins by one but when propagated to the set of output pins; and an enable point-to-point signal path configured to connect a first input pin to an enable component of the stackable memory device.

20 Claims, 4 Drawing Sheets

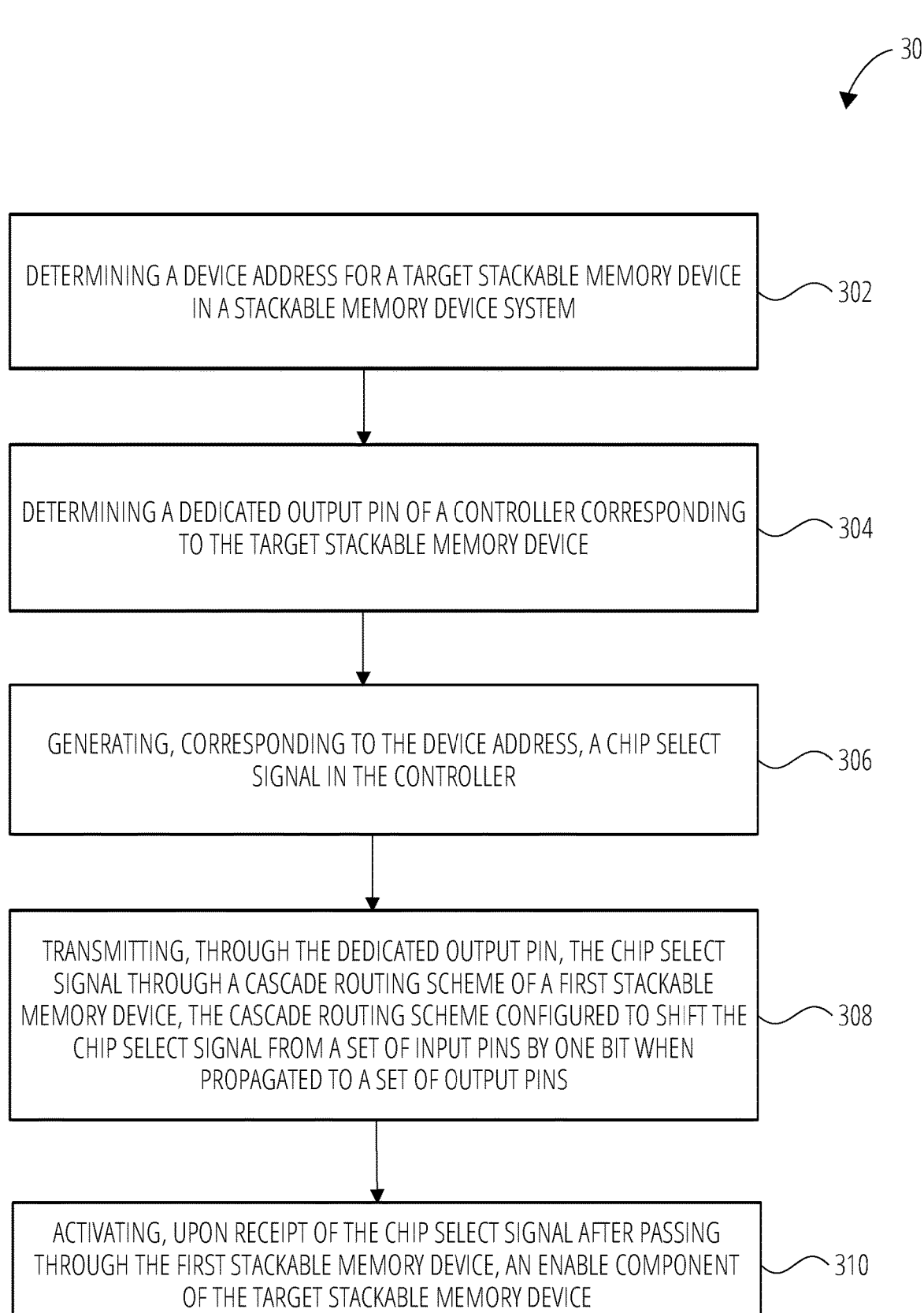

300

DETERMINING A DEVICE ADDRESS FOR A TARGET STACKABLE MEMORY DEVICE IN A STACKABLE MEMORY DEVICE SYSTEM ⟩ 302

DETERMINING A DEDICATED OUTPUT PIN OF A CONTROLLER CORRESPONDING TO THE TARGET STACKABLE MEMORY DEVICE ⟩ 304

GENERATING, CORRESPONDING TO THE DEVICE ADDRESS, A CHIP SELECT SIGNAL IN THE CONTROLLER ⟩ 306

TRANSMITTING, THROUGH THE DEDICATED OUTPUT PIN, THE CHIP SELECT SIGNAL THROUGH A CASCADE ROUTING SCHEME OF A FIRST STACKABLE MEMORY DEVICE, THE CASCADE ROUTING SCHEME CONFIGURED TO SHIFT THE CHIP SELECT SIGNAL FROM A SET OF INPUT PINS BY ONE BIT WHEN PROPAGATED TO A SET OF OUTPUT PINS ⟩ 308

ACTIVATING, UPON RECEIPT OF THE CHIP SELECT SIGNAL AFTER PASSING THROUGH THE FIRST STACKABLE MEMORY DEVICE, AN ENABLE COMPONENT OF THE TARGET STACKABLE MEMORY DEVICE ⟩ 310

FIG. 3

REDUCED PIN COUNT STACKABLE MEMORY

GOVERNMENT RIGHTS

This invention was made with Government support under Contract Number SC001-0000001482. The Government has certain rights in this invention.

TECHNICAL FIELD

Embodiments discussed herein regard devices, systems, machine-readable media, and methods in the field of stackable memory. Embodiments regard a stackable memory device that uses an internal routing scheme to identify devices based on a chip select signal without requiring additional address pins in a carrier or an interposer.

BACKGROUND

Stackable memory technology is used in high-performance and energy-efficient applications across industries due to its ability to provide high memory density, low power consumption, and fast data access. Approaches to implementing stackable memory use identification pins on each device. The identification pins provide input to an address decoder and dedicated device identification mechanisms to manage the increased density of stack configurations.

Current solutions employ either additional pins to assign unique identifications to each stackable device or implement point-to-point connections requiring separate routing paths for each device in the stack.

BRIEF DESCRIPTION OF THE DRAWINGS

FIG. 3 illustrates, by way of example, a flow diagram of an embodiment of a method for accessing computer memory from a stackable memory system.

DETAILED DESCRIPTION

Figure 1:
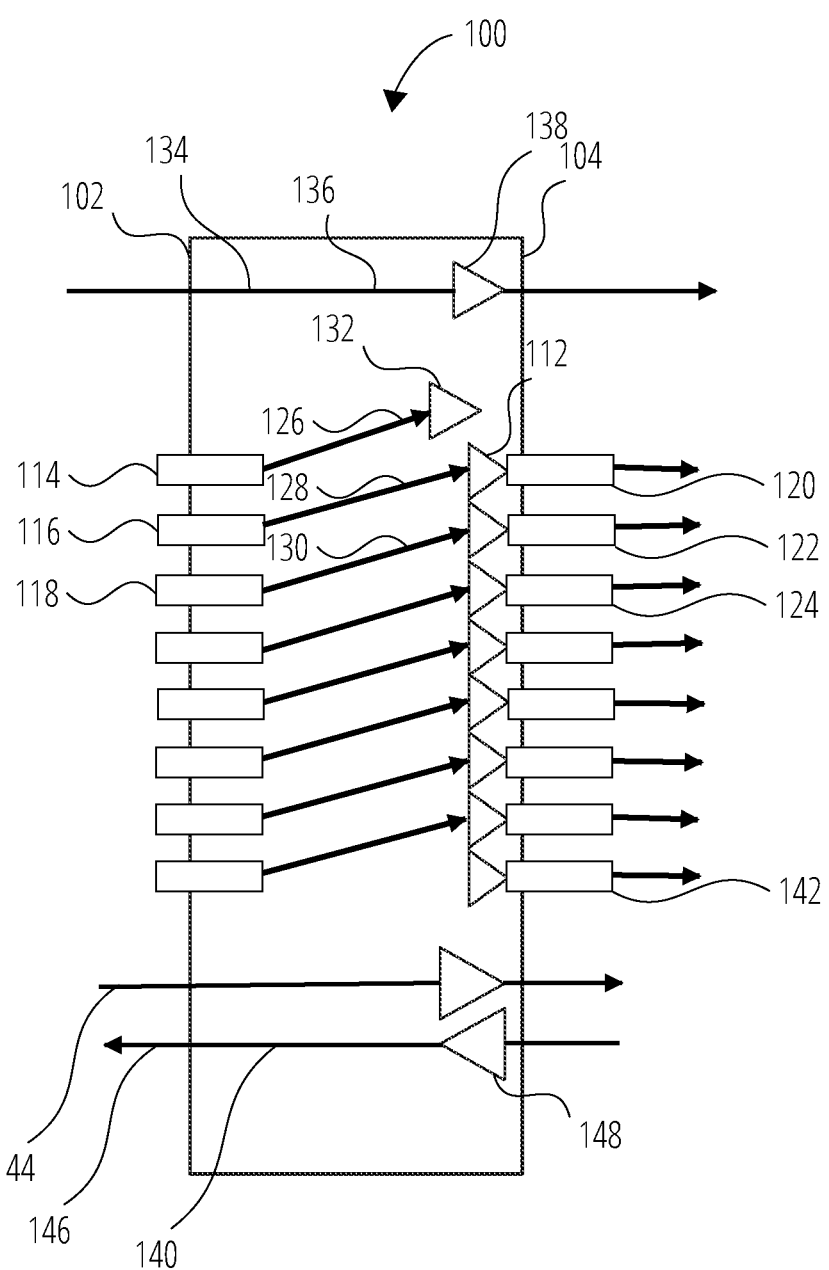
FIG. 1 illustrates, by way of example, a stackable memory device.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Stackable memory technology faces several technical problems. Some stackable memory solutions use identification pins and address decoders to identify whether a given read or write request is intended for a given memory. Some stackable memory topologies use dedicated identification (ID) pins on each stackable device to enable unique identification. The use of such topologies can increase pin count, die area, and routing complexity. Such topologies also rely on address decoders to assign address signals, requiring point-to-point connections that become more complex as more devices are added to the stack. Each add-on device compares upper address bits to identification (ID) pins for activation, requiring additional circuitry and personalization for each device. Some solutions implement counting logic that use initialization sequences to assign unique identifiers, adding operational overhead and complexity.

Both these approaches can increase the physical footprint of stackable memory systems through additional pins and routing requirements.

The systems and methods described herein address one or more of the technical problems. A stackable memory device with a cascade routing signal scheme allows for address identification without the use of additional input memory ID pins. The stackable memory device can be used in unison with other similar stackable memory devices to form a stacked memory system. The stacked memory system can be used in components in high-performance computing systems where the stacked memory system can enable high memory density, fast data access, and reduced power consumption. One or more benefits of the stacked memory system can be achieved through efficient device selection and minimal pin count design.

The stackable memory device can employ a cascade of internal routing connections that pass through the stackable memory device. The cascade of internal routing connections enables a signal propagation scheme that connects one side of the device to the other without requiring additional external routing or ID pins. The cascade routing signal scheme can allow the stackable memory device to be connected to a logic device, a controller, a graphics processing unit (GPU), a central processing unit (CPU), or another stackable memory device. The cascade routing signal scheme can maintain device addressability through physical position-based identification even without the typical pin-based addressing methods. The cascade routing signal scheme can enable efficient stacking by implementing internal routing and signal propagation pathways within each stackable memory device, eliminating the need for external address routing components like carriers or interposers. The cascade routing signal scheme can support expandable memory configurations through physical stacking, with each stackable memory device containing a signal propagation logic to interface with adjacent stackable memory devices in the stack. The cascade routing signal scheme can maintain proper signal flow through the cascade chain of multiple stackable memory devices. The cascade routing scheme allows the stackable memory devices and the signals provided to each memory in the stackable memory devices to be uniform (although a chip select signal may be shifted by one bit relative to a directly adjacent stacked memory device).

The cascade design enables the use of identical stackable memory devices that can be added or removed on a multidrop bus. The cascade design can enable each individual stackable memory device to be uniquely identified based on their physical position within the stack. The cascade design can allow a controller to recognize and address each stackable memory device according to its specific placement in the stackable arrangement.

FIG. 1 illustrates, by way of example, a stackable memory device. The stackable memory device 100 can include a first surface 102 on one side of the stackable memory device 100, and a second surface 104 opposite the first surface 102 of the stackable memory device 100. On the first surface 102, the stackable memory device 100 can include a set of input pins that can be configured to receive chip select signals from an address decoder on an external controller. The set of input pins can be represented in FIG. 1 as a first input pin 114, a second input pin 116, and a third input pin 118. The set of input pins are not limited to these three pins, and can include additional input pins not depicted or labelled in FIG. 1. On the second surface 104, the stackable memory device 100 can include a set of output pins, the output pins can be configured to output chip select signals transmitted through the stackable memory device 100. The set of output pins can be represented in FIG. 1 as a first output pin 120, a second output pin 122, a third output pin 124, and a last output pin 142. The set of output pins are not limited to these four pins, and can include additional output pins not depicted or labelled in FIG. 1. In some examples, the input pins and output pins can include a variety of different formats, such as, wire bond pads, flip-chip bumps, micro-bumps, a ball grid array, a land grid array, hybrid bonding, edge connectors, copper pillars, optical connections, pressure contacts, through silicon vias (TSVs), or a combination thereof. In some examples, the input pins and output pins can comply with standard protocols determining physical pin arrangements, such as, the Joint Electron Device Engineering Council (JEDEC) standard, the open NAND Flash interface (ONFI) standard, or the Wide I/O standard. In some examples, the input pins can be configured as female-type connectors, while the output pins can be configured as male-type connectors.

In some examples, the configuration of the output pins mirrors and matches the arrangement of the input pins. The matching configuration of input pins and output pins can create alignment points for multiple stackable memory devices 100 to be stacked. The matching configuration can allow the output pins to propagate chip select signals received through the input pins to subsequent devices in the stack. The matching arrangement of the input pins and output pins can enable coupling multiple stackable memory devices 100 to form a memory stack, while maintaining proper signal propagation through the memory stack. The matching configuration can allow for modular expansion of memory capacity through the addition of identical stackable memory devices 100, each maintaining the same pin configuration for consistent interconnection.

Internally, the stackable memory device 100 can implement a cascade routing signal scheme that connects the input pins to the output pins. The cascade routing signal scheme can be represented in FIG. 1 as a second point-to-point signal path 128 and a third point-to-point signal path 130. The cascade routing signal scheme is not limited to these two signal paths, and can include additional signal paths not depicted or labelled in FIG. 1. The cascade routing signal scheme can include dedicated point-to-point signal paths that shift chip select signals by one bit position when propagating from the input pins to the output pins through the stackable memory device 100. That is, if a chip select signal of "00100000" is received at the input pins represented by 114, 116, 118, the signal received at the output pins 120, 122, 124, would be "01000000". The cascade routing signal scheme can be propagated through a stack while maintaining signal integrity via integrated signal buffers 112. A most or least significant bit of the chip select signal can act as an enable bit. The enable bit can be propagated to an enable component 132. If the enable bit is asserted (or de-asserted if negative logic is implemented) the corresponding memory causes the operation indicated by other multidrop signals to be performed on the address of yet other multidrop signals.

The cascade routing signal scheme can provide several benefits when implemented in a stackable memory device 100. The cascade routing signal scheme can enable expandable memory capacity without requiring additional identification pins or complex addressing circuitry. The cascade routing signal scheme allows each stackable memory device 100 to be uniquely identified based on its physical position in a stack (by way of a shifted chip select signal), eliminating the need for separate device identification pins or address personalization.

From a manufacturing and integration perspective, the cascade routing signal scheme can enable modular expansion since the stackable memory devices 100 can be identical and standardized. The identical and standardized nature can allow for the stackable memory device 100 to be added and removed from the memory stack easily. The standardization can simplify production and system assembly, while reducing costs by eliminating device-specific configurations.

The cascade routing signal scheme can begin with a first input pin 114 connected via an enable point-to-point signal path 126 to an enable component 132. The enable point-to-point signal path 126 can allow for direct device selection by a chip select signal. A second input pin 116 initiates the cascade pattern by connecting to a first output pin 120 via a second point-to-point signal path 128. The cascade pattern can continue running sequentially through the remaining input pins and output pins. For example, the third input pin 118 can be connected to a second output pin 122 via a third point-to-point signal path 130. After passing through the cascade routing signal scheme, the chip select signals can be shifted by one bit. The shifting by one bit can create a unique selection pattern for each physical position without requiring additional identification pins. In some examples, the cascade routing signal scheme can include 1, 2, 3, 4, 5, 6, 7, 8, or more point-to-point signal paths to connect the corresponding number of input pins to output pins.

Due to the shifting of the chip select signals, the last output pin 142 can be configured to not be connected to a corresponding input pin. Although the last output pin 142 lacks a corresponding connection to a corresponding input pin, the last output pin 142 can still be incorporated into the set of output pins to maintain modularity and enable stacking functionality of the stackable memory device 100. The configuration of output pins can ensure proper alignment between the output pins of a first stackable memory device 100 and the input pins of a second stackable memory device 100 to preserve the cascade routing signal scheme's expandability. The inclusion of the last output pin 142 into the output pins can enable the stackable memory device 100 to be interchangeably positioned within a memory stack, despite the last output pin's 142 lack of internal connection to a corresponding input pin.

The point-to-point signal paths of the cascade routing signal scheme can be achieved by a variety of different physical structures in various configurations, such as, a stepped configuration, staircase configuration, a diagonal configuration, or a combination thereof.

The cascade routing signal scheme can provide broad compatibility and can be implemented for a variety of memory devices and other 3D packaging technologies. Examples of other stackable memory systems that the cascade routing signal scheme can be implemented include, package-on-package, wire-bonded, hybrid memory cube, face-to-face device stacking, wafer-level stack, side-by-side device stacking, or the like.

Signal buffers 112 can be integrated into each point-to-point connection between input pins and output pins in the cascade routing signal scheme. A signal buffer 112 can serve to strengthen and clean incoming chip select signals before driving them to the corresponding outputs. The strengthening of the chip select signals ensures proper signal integrity for propagation through subsequent stacked devices. The signal buffer 112 can isolate a source from a load to prevent the load from affecting the signal's integrity, voltage levels, or waveform.

In some examples, the stackable memory device 100 can incorporate a control and address multidrop bus 134. The control and address multidrop bus 134 can be implemented using a control and address bus electrical interconnect 136 for signal transmission between stacked devices. The control and address multidrop bus 134 can serve as a shared communication pathway that enables the transmission of a control signal and a memory address from an external controller to multiple stackable memory devices 100. The control and address multidrop bus 134 can operate by broadcasting a control command and an address information simultaneous to connected stackable memory devices 100 in the stack, while the cascade routing signal scheme determines which specific device responds to the command. The multidrop nature of the control and address multidrop bus 134 can allow the control and address signals to propagate through the electrical interconnect to reach each stacked device. The control and address signals' integrity can be maintained through an integrated signal buffer 138. The combination of control and address multidrop bus 134 and the cascade routing signal scheme can enable command and address distribution throughout the memory stack while supporting the overall cascade routing signal scheme for device selection. In some examples, the electrical interconnect can include a variety of different formats, such as, a wire bond pad, a flip-chip bump, a micro-bump, a ball grid array, a land grid array, hybrid bonding, an edge connector, a copper pillar, an optical connection, a pressure contact, a through silicon via (TSV), or a combination thereof.

In some examples, the stackable memory device 100 can include a data query multidrop bus 140. The data query multidrop bus 140 can be implemented using data query electrical interconnects to enable bidirectional data transfer between the stackable memory devices 100. The data query multidrop bus 140 can function as a shared pathway for reading and writing data to and from the stackable memory devices 100 in the stack. The data query multidrop bus 140 can operate in conjunction with the control and address multidrop bus 134. The bidirectional data query multidrop bus 140 can allow data to flow both up and down the stack through electrical interconnects with data query signal buffers 148 maintaining signal quality across multiple stacked devices. When a specific stackable memory device 100 is selected through the cascade routing signal scheme, the stackable memory device 100 can respond to read/write commands by transmitting or receiving data through the data query multidrop bus 140. The multidrop architecture of the data query multidrop bus 140 can enable efficient data transfer while minimizing the number of vertical interconnections between the stackable memory devices 100. In some examples, the data query multidrop bus 140 can include two electrical interconnects for high-speed or full-duplex communication. In some examples, the two electrical interconnects can include a data query input electrical interconnect 144 and a data query output electrical interconnect 146. In some examples, the electrical interconnect of the data query multidrop bus 140 can include a variety of different formats, such as, a wire bond pad, a flip-chip bump, a micro-bump, a ball grid array, a land grid array, hybrid bonding, an edge connector, a copper pillar, an optical connection, a pressure contact, a TSV, or a combination thereof.

In some examples, the stackable memory device 100 can include other pin types, such as, a power pin, a ground pin, a TSV pin, a programming pin, a test pin, a debug pin, or a combination thereof.

In some examples, the stackable memory device 100 can be designed to be compatible with VITA portable extended (VPX) bus specifications. The cascade routing signal scheme and pin configurations can be adapted to interface with a VPX (VITA 46) standard's high-speed differential signaling requirement and multi-gigabit data rates.

Figure 2:
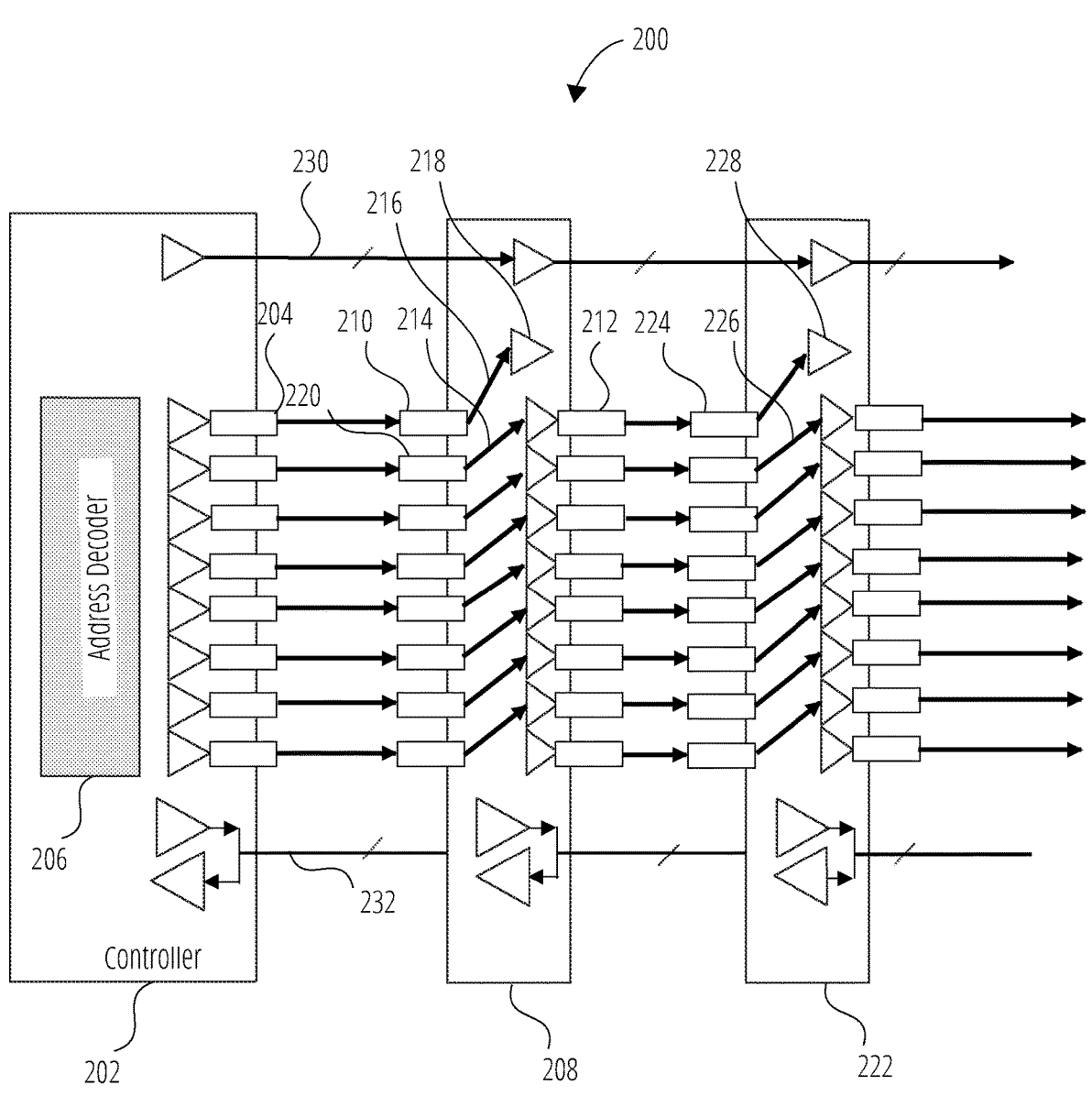
FIG. 2 illustrates, by way of example, a stackable memory system.

FIG. 2 illustrates, by way of example, a stackable memory system. The stackable memory system 200 can include a controller 202 and one or more stackable memory devices shown in FIG. 1. The controller 202 can be implemented as a CPU or a GPU that manages memory operations. The controller 202 can include a set of controller output pins 204 for interfacing with a stackable memory device. The controller output pins 204 can connect to an integrated address decoder 206 on the controller 202 through dedicated point-to-point connections that can enable device selection and control.

A first stackable memory device 208 can be stacked on the controller 202, with the first stackable memory device input pins 210 of the first stackable memory device 208 mating with the controller output pins 204 to establish electrical connectivity. A second stackable memory device 222 can be stacked on the first stackable memory device 208, with the second stackable memory device input pins 224 mating with the first stackable memory device output pins 212. The stacking ability of the first stackable memory device 208 and the second stackable memory device 222 can be enabled by a matching configuration of input pins and output pins between the devices. The stacking ability can allow multiple stackable memory devices to occupy the same footprint. The identical nature of the stackable memory devices eliminates the need for specialized devices at different stack positions or configurations. The identical nature of the stackable memory devices can enable the use of a single standardized device type throughout the stack of the stackable memory system 200.

In some examples, the first stackable memory device 208 can be configured with the controller 202 or the second stackable memory device 222 through various physical interconnection mechanisms that can be either permanent or removable in nature. In some examples, micro bump arrays or ball grid arrays can be implemented to create solder joints between stackable memory devices, providing both mechanical stability and electrical connectivity. In some examples, removable connections can be achieved through male and female pin arrangements, where the input pins of the second stackable memory device 222 mate with corresponding output pins of the first stackable memory device 208. In an example, the first stackable memory device input pins 210 can be configured as female-type connectors, while the first stackable memory device output pins 212 can be configured as male-type connectors.

In some examples, coupling options can include input pin pads that interface with matching contact points, traditional leaded pin configurations that allow for modular assembly and disassembly, or edge connectors that can enable lateral connection points between stacked components. The selection of connection type can be selected based on requirements, such as, signal integrity, mechanical durability, thermal management, assembly or rework capabilities, maintaining cascade routing functionality between stacked devices, or a combination thereof.

The signal routing of the stackable memory system 200 can begin at the controller output pins 204, which connects to the first stackable memory device input pins 210. The controller 202 can generate chip select signals that can propagate through the first cascade routing signal scheme 214. The first cascade routing signal scheme 214 can connect to the first stackable memory device output pins 212, which then mates with the second stackable memory device input pins 224. The second stackable memory device input pins 224 can in turn connect to the second cascade routing signal scheme 226. The signal routing can continue to propagate through a third, fourth, or more stackable memory devices, creating a continuous signal path from the controller 202 through the stack.

The signal routing of the stackable memory system 200 can enable the controller's 202 address decoder 206 to individually select and activate specific stackable memory devices using a binary addressing scheme. When the controller needs to access a particular stackable memory device, the address decoder 206 can generate chip set signals that propagate through the controller output pins 204. In one example, to select the first stackable memory device 208, the controller 202 can assign the first bit of the chip select signal to the first stackable memory device 208. That is, the chip select signal of "10000000" can be generated. The signal propagation can be broken down into multiple steps. First, the first bit can travel along the controller output pins 204 to reach the first stackable memory device input pins 210. Next, the first bit can be routed through a dedicated enable point-to-point connection 216 to a first stackable memory device enable component 218. Third, upon receipt of this signal, the first stackable memory device enable component 218 can activate the first stackable memory device 208, preparing it for subsequent read or write operations.

To access the second stackable memory device 222, the controller 202 can assign the second bit of the chip select signal to the second stackable memory device 222. That is, the chip select signal of "01000000" can be generated by the controller 202. The second bit of the chip select signal can enter the first stackable memory device 208 through its second input pin 220 and propagate through the first cascade routing signal scheme 214. During the propagation, the chip select signal can undergo a one-bit shift as the first cascade routing signal scheme 214 routes the first bit of the chip select signal to the first stackable memory device enable component 218, while propagating the other bits through the first stackable memory device 208. The second bit from the controller 202 becomes the first bit exiting the first stackable memory device 208. That is, the chip select signal exiting the first stackable memory device would be "10000000". The shifted chip select signal then travels to the second stackable memory device 222, and the first bit of the shifted chip select signal then travels to a second stackable memory device enable component 228 through a dedicated point-to-point connection. The second bit from the controller 202 after propagating through the controller output pins 204, first stackable memory device input pins 210, first cascade routing signal scheme 214, first stackable memory device output pins 212, second stackable memory device input pins 224 and a point-to-point connect to the second stackable memory device enable component 228, can activate the second stackable memory device enable component 228. To access and activate the second stackable memory device 222, the signal routing of the stackable memory system 200 can utilize the first cascade routing signal scheme 214 and second cascade routing signal scheme 226 of the first stackable memory device 208 and second stackable memory device 222 respectively, without the need for external or additional address identification pins or address logic components.

In some examples, upon activation of the second stackable memory device enable component 228, there can be a verification signal generated, and a deactivation of the second stackable memory device 222 upon completion of a memory access operation.

The routing system of the stackable memory system 200 can extend to additional stackable memory devices with signal buffers integrated into each stackable memory devices to maintain signal integrity for downstream propagation.

In some examples, in a stackable memory system 200, the address decoder 206 can utilize eight output pins to transmit 8-bit chip select signals, with each dedicated to a specific device in the stackable memory system 200. The scalable architecture can enable a modular design that can expand the system through addition of standardized stackable memory devices.

The modular design can allow configurations ranging from a single device implementation to progressively larger arrangements of 2, 4, 8, 16 devices, or the like. The stackable nature of the system can preserve the same physical footprint regardless of capacity, as additional devices can be integrated using a standardized pin layout and cascade routing signal scheme. The stackable nature can impart a building-block functionality that can include flexibility for scaling memory capacity by stacking additional identical devices, while maintaining compatibility with existing interconnect architecture.

In some examples, the stackable memory system 200 can include a control multidrop bus 230 connecting the controller 202, the first stackable memory device 208, and the second stackable memory device 222. The control multidrop bus 230 can connect more than two stackable memory devices. The control multidrop bus 230 can be implemented using an electrical interconnect, enabling vertical signal transmission through the device stack. In some examples, the electrical interconnect can include a variety of different formats, such as, a wire bond pad, a flip-chip bump, a micro-bump, a ball grid array, a land grid array, hybrid bonding, an edge connector, a copper pillar, an optical connection, a pressure contact, a TSV, or a combination thereof. The control and address signals' integrity can be maintained through an integrated signal buffer.

In some examples, the stackable memory system 200 can include a data query multidrop bus 232 connecting the controller 202, the first stackable memory device 208, and the second stackable memory device 222. The data query multidrop bus 232 can connect more than two stackable memory devices. The data query multidrop bus 232 can be implemented through one or more electrical interconnects to enable bidirectional data transfer between the controller 202 and stackable memory devices. In some examples, the electrical interconnect of the data query multidrop bus 232 can include a variety of different formats, such as, a wire bond pad, a flip-chip bump, a micro-bump, a ball grid array, a land grid array, hybrid bonding, an edge connector, a copper pillar, an optical connection, a pressure contact, a TSV, or a combination thereof.

The data query signals' integrity can be maintained through an integrated signal buffer.

In some examples, the stackable memory system 200 can transmit, through a control and address multidrop bus 230, a memory access command; transmit, through a data query multidrop bus 232, and synchronize the chip select signal with the memory access command.

The stackable memory system 200 can be used in a variety of memory systems, such as, dynamic random-access memory (DRAM), static random-access memory (SRAM), 3D Not-AND (NAND) flash memory, 3D Not-OR (NOR) flash memory, phase change memory (PCM), resistive RAM (RcRAM), magneto resistive ram (MRAM), on-ship stacked cache memory, hybrid memory cube (HMC), near-memory computing, embedded DRAM (cDRAM), embedded flash, or the like.

FIG. 3 illustrates, by way of example, a flow diagram of an embodiment of a method for accessing computer memory from a stackable memory system.

The method 300, as illustrated, includes an operation 302 to determine a device address for a target stackable memory device in a stackable memory device system; an operation 304 to determine a dedicated output pin of a controller corresponding to the target stackable memory device; an operation 306 to generate, corresponding to the device address, a chip select signal in the controller; an operation 308 to transmit, through the dedicated output pin, the chip select signal through a cascade routing scheme of a first stackable memory device, the cascade routing scheme configured to shift the chip select signal from a set of input pins by one bit when propagated to a set of output pins; an operation at 310 to activate, upon receipt of the chip select signal after passing the first stackable memory device, an enable component of the target stackable memory device.

The method 300 can further include to buffer the chip select signal to maintain signal integrity of the chip select signal as the chip select signal propagates from the set of input pins to the set of output pins.

The method 300 can further include to verify a successful activation of the target stackable memory device; and deactivate the target stackable memory device upon a completion of a memory access operation.

The method 300 can further include to transmit, through a control and address multidrop bus, a memory access command; to transmit, through a data query multidrop bus, data; and to synchronize the chip select signal activation with the memory access command.

The operation 306 can further include, wherein the chip select signal is generated from a computer processing unit or a graphics process unit.

The operation 310 can further include, wherein to activate an enable component of the target stackable memory device includes: to receive, through a set of input pins of the target stackable memory device, the chip select signal at the target stackable memory device; to transmit, through an enable point-to-point signal path configured to connect a first input pin to an enable component of the target stackable memory device; and to activate a memory access operation on the target stackable memory device.

Figure 4:
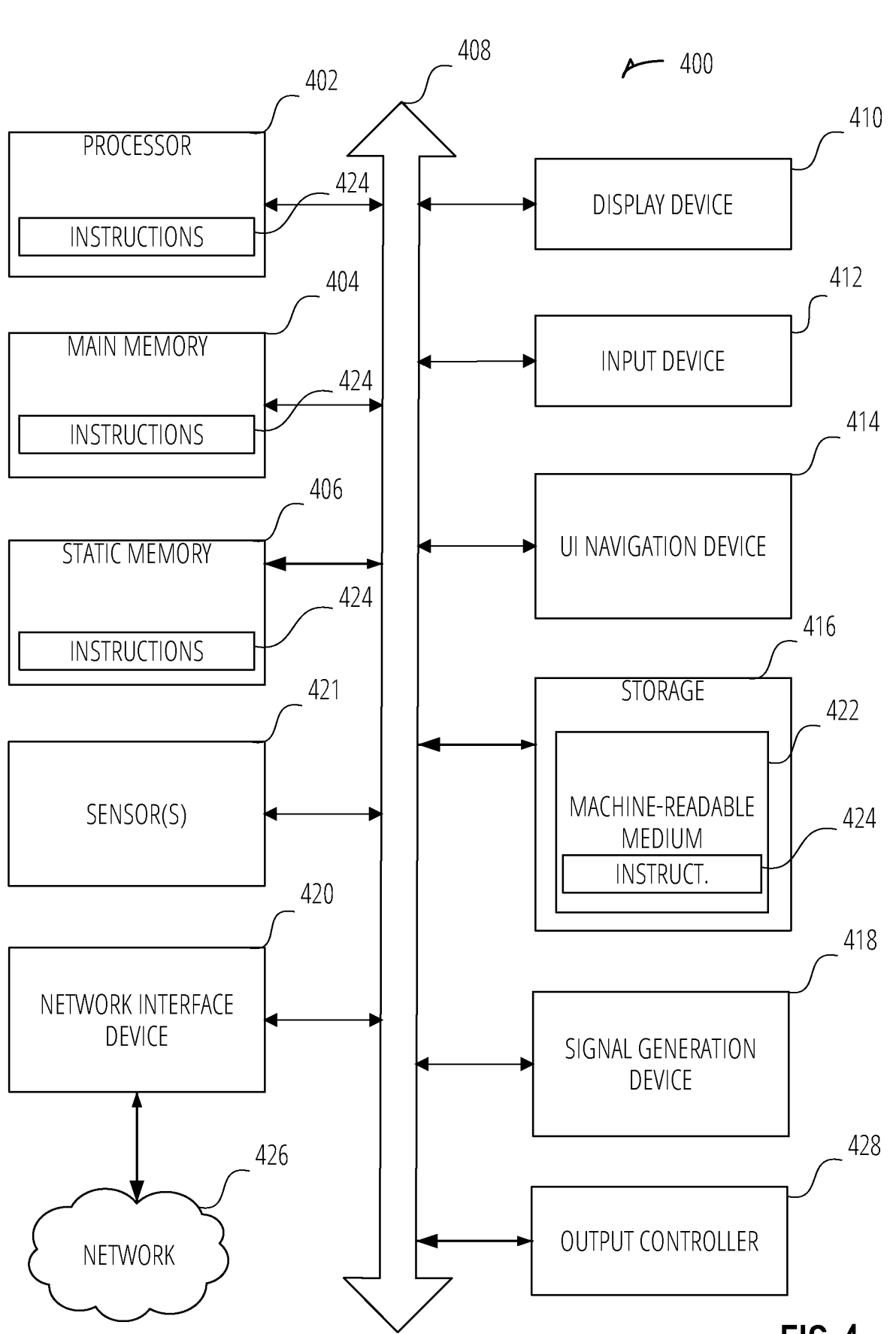
FIG. 4 illustrates, by way of example, a block diagram of an embodiment of a machine in the example form of a computer system within which instructions, for causing the machine to perform any one or more of the methodologies discussed herein, may be executed.

FIG. 4 illustrates generally an example of a block diagram of a machine upon which any one or more of the techniques discussed herein can perform in accordance with at least one example of this disclosure. This example machine can operate some or all of the stackable memory system discussed herein. In some examples, the stackable memory system can operate on the example machine 400. In other examples, the example machine 400 is merely one of many such machines used to operate the stackable memory system. In alternative embodiments, the example machine 400 can operate as a standalone device or can be connected (e.g., networked) to other machines. In a networked deployment, the example machine 400 can operate in the capacity of a server machine, a client machine, or both in server-client network environments. In an example, the example machine 400 can act as a peer machine in peer-to-peer (P2P) (or other distributed) network environment. The example machine 400 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 400 can include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The example machine 400 can further include a display device 410, an alphanumeric input device 412 (e.g., a keyboard), and a user interface (UI) navigation device 414 (e.g., a mouse). In an example, the display device 410, input device 412 and UI navigation device 414 can be a touch screen display. The 400 can additionally include a storage device 416 (e.g., drive unit), a signal generation device 418 (e.g., a speaker), a network interface device 420, and one or more sensors 421, such as a global positioning system (GPS) sensor, compass, accelerometer, or other sensor. The 400 can include an output controller 428, such as a serial (e.g., Universal Serial Bus (USB), parallel, or other wired or wireless (e.g., infrared (IR), near field communication (NFC), etc.) connection to communicate or control one or more peripheral devices (e.g., a printer, card reader, etc.).

The storage device 416 can include a machine readable medium 422 on which is stored one or more sets of data structures or instructions 424 (e.g., software) embodying or utilized by any one or more of the techniques or functions described herein. The instructions 424 can also reside, completely or at least partially, within the main memory 404, within static memory 406, or within the hardware processor 402 during execution thereof by the 400. In an example, one or any combination of the hardware processor 402, the main memory 404, the static memory 406, or the storage device 416 can constitute machine readable media.

While the machine-readable medium 422 is illustrated as a single medium, the term "machine readable medium" can include a single medium or multiple media (e.g., a centralized or distributed database, or associated caches and servers) configured to store the one or more instructions 424. The term "machine readable medium" can include any medium that is capable of storing, encoding, or carrying instructions for execution by the 400 and that cause the 400 to perform any one or more of the techniques of the present disclosure, or that is capable of storing, encoding or carrying data structures used by or associated with such instructions. Non-limiting machine-readable medium examples can include solid-state memories, and optical and magnetic media.

The instructions 424 can further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), and wireless data networks (e.g., Institute of Electrical and Electronics Engineers (IEEE) 702.11 family of standards known as Wi-Fi®, IEEE 402.16 family of standards known as WiMax®), IEEE 702.15.4 family of standards, peer-to-peer (P2P) networks, among others. In an example, the network interface device 420 can include one or more physical jacks (e.g., Ethernet, coaxial, or phone jacks) or one or more antennas to connect to the communications network 426. In an example, the network interface device 420 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the 400, and includes digital or analog communications signals or other intangible medium to facilitate communication of such software.

Examples and Additional Notes

Example 1 is a stackable memory device comprising: a first surface with a set of input pins, the set of input pins configured to receive chip select signals from an address decoder of a controller; a second surface with a set of output pins, the set of output pins arranged in a matching configuration to the set of input pins to enable coupling and stacking of multiple stackable memory devices; and a cascade routing signal scheme including: a set of dedicated point-to-point signal paths configured to shift the chip select signals from the set of input pins by one bit when propagated to the set of output pins; and an enable point-to-point signal path configured to connect a first input pin to an enable component of the stackable memory device.

In Example 2, the subject matter of Example 1 includes, wherein each dedicated point-to-point signal path includes a signal buffer configured to maintain signal integrity of the chip select signals as the chip select signals propagate from the set of input pins to the set of output pins.

In Example 3, the subject matter of Examples 1-2 includes, wherein the set of output pins is configured to couple with a second set of input pins of a second stackable memory device.

In Example 4, the subject matter of Example 3 includes, wherein the stackable memory device is configured to couple with the second stackable memory device using male and female pins, input pin pad, ball grid arrays, leaded pins, edge connectors, through silicon vias (TSVs), or micro bump arrays.

In Example 5, the subject matter of Examples 1~4 includes, wherein the set of input pins are configured as female-type connectors, and the set of output pins are configured as male-type connectors.

In Example 6, the subject matter of Examples 1-5 includes, wherein the stackable memory device includes a control and address multidrop bus.

In Example 7, the subject matter of Examples 1-6 includes, wherein the stackable memory device includes a data query multidrop bus.

Example 8 is a stackable memory system comprising: a controller including: an address decoder; and a set of controller output pins; and a stackable memory device including: a first surface with a set of input pins, the set of input pins coupled to the set of controller output pins, the set of input pins configured to receive chip select signals from the address decoder; a second surface with a set of output pins, the set of output pins arranged in a matching configuration to the set of input pins to enable coupling and stacking of multiple stackable memory devices; and a cascade routing signal scheme including: a set of dedicated point-to-point signal paths configured to shift the chip select signals from the set of input pins by one bit when propagated to the set of output pins; and an enable point-to-point signal path configured to connect a first input pin to an enable component of the stackable memory device.

In Example 9, the subject matter of Example 8 includes, wherein each dedicated point-to-point signal path includes a signal buffer configured to maintain signal integrity of the chip select signals as the chip select signals propagate from the set of input pins to the set of output pins.

In Example 10, the subject matter of Examples 8-9 includes, a second stackable memory device, wherein the set of output pins of the stackable memory device is configured to couple with a second set of input pins of the second stackable memory device.

In Example 11, the subject matter of Example 10 includes, wherein the cascade routing signal scheme of the stackable memory device is coupled to a second cascade routing signal scheme of the second stackable memory device.

In Example 12, the subject matter of Examples 10-11 includes, wherein the stackable memory device is configured to couple with the second stackable memory device using male and female pins, input pin pad, ball grid arrays, leaded pins, edge connectors, through silicon vias (TSVs), or micro bump arrays.

In Example 13, the subject matter of Examples 10-12 includes, a control multidrop bus connecting the controller, stackable memory device, and the second stackable memory device.

In Example 14, the subject matter of Examples 10-13 includes, a data query multidrop bus connecting the controller, stackable memory device, and the second stackable memory device.

Example 15 is a method of accessing computer memory from a stackable memory system, the method comprising: determining a device address for a target stackable memory device in a stackable memory device system; determining a dedicated output pin of a controller corresponding to the target stackable memory device; generating, corresponding to the device address, a chip select signal in the controller; transmitting, through the dedicated output pin, the chip select signal through a cascade routing scheme of a first stackable memory device, the cascade routing scheme configured to shift the chip select signal from a set of input pins by one bit when propagated to a set of output pins; and activating, upon receipt of the chip select signal after passing through the first stackable memory device, an enable component of the target stackable memory device.

In Example 16, the subject matter of Example 15 includes, buffering the chip select signal to maintain signal integrity of the chip select signal as the chip select signal propagates from the set of input pins to the set of output pins.

In Example 17, the subject matter of Examples 15-16 includes, verifying a successful activation of the target stackable memory device; and deactivating the target stackable memory device upon a completion of a memory access operation.

In Example 18, the subject matter of Examples 15-17 includes, transmitting, through a control and address multidrop bus, a memory access command; transmitting, through a data query multidrop bus, data; and synchronizing the chip select signal with the memory access command.

In Example 19, the subject matter of Examples 15-18 includes, wherein the chip select signal is generated from a computer processing unit or a graphics processing unit.

In Example 20, the subject matter of Examples 15-19 includes, wherein activating an enable component of the target stackable memory device includes: receiving, through a set of input pins of the target stackable memory device, the chip select signal at the target stackable memory device; transmitting, through an enable point-to-point signal path configured to connect a first input pin to an enable component of the target stackable memory device; and activating a memory access operation on the target stackable memory device.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instance or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A stackable memory device comprising: a first surface with a set of input pins, the set of input pins configured to receive chip select signals from an address decoder of a controller; a second surface with a set of output pins, the set of output pins arranged in a matching configuration to the set of input pins to enable coupling and stacking of multiple stackable memory devices; and a cascade routing signal scheme including: a set of dedicated point-to-point signal paths configured to shift the chip select signals from the set of input pins by one bit when propagated to the set of output pins; and an enable point-to-point signal path configured to connect an input pin to an enable component of the stackable memory device.

2. The stackable memory device of claim 1, wherein each dedicated point-to-point signal path includes a signal buffer configured to maintain signal integrity of the chip select signals as the chip select signals propagate from the set of input pins to the set of output pins.

3. The stackable memory device of claim 1, wherein the set of output pins is configured to couple with a second set of input pins of a second stackable memory device.

4. The stackable memory device of claim 3, wherein the stackable memory device is configured to couple with the second stackable memory device using male and female pins, input pin pad, ball grid arrays, leaded pins, edge connectors, through silicon vias (TSVs), or micro bump arrays.

5. The stackable memory device of claim 1, wherein the set of input pins are configured as female-type connectors, and the set of output pins are configured as male-type connectors.

6. The stackable memory device of claim 1, wherein the stackable memory device includes a control and address multidrop bus.

7. The stackable memory device of claim 1, wherein the stackable memory device includes a data query multidrop bus.

8. A stackable memory system comprising: a controller including: an address decoder, and a set of controller output pins; and a stackable memory device including: a first surface with a set of input pins, the set of input pins coupled to the set of controller output pins, the set of input pins configured to receive chip select signals from the address decoder; a second surface with a set of output pins, the set of output pins arranged in a matching configuration to the set of input pins to enable coupling and stacking of multiple stackable memory devices; and a cascade routing signal scheme including: a set of dedicated point-to-point signal paths configured to shift the chip select signals from the set of input pins by one bit when propagated to the set of output pins; and an enable point-to-point signal path configured to connect an input pin to an enable component of the stackable memory device.

9. The stackable memory system of claim 8, wherein each dedicated point-to-point signal path includes a signal buffer configured to maintain signal integrity of the chip select signals as the chip select signals propagate from the set of input pins to the set of output pins.

10. The stackable memory system of claim 8, comprising a second stackable memory device, wherein the set of output pins of the stackable memory device is configured to couple with a second set of input pins of the second stackable memory device.

11. The stackable memory system of claim 10, wherein the cascade routing signal scheme of the stackable memory device is coupled to a second cascade routing signal scheme of the second stackable memory device.

12. The stackable memory system of claim 10, wherein the stackable memory device is configured to couple with the second stackable memory device using male and female pins, input pin pad, ball grid arrays, leaded pins, edge connectors, through silicon vias (TSVs), or micro bump arrays.

13. The stackable memory system of claim 10, comprising a control multidrop bus connecting the controller, stackable memory device, and the second stackable memory device.

14. The stackable memory system of claim 10, comprising a data query multidrop bus connecting the controller, stackable memory device, and the second stackable memory device.

15. A method of accessing computer memory from a stackable memory system, the method comprising:
   determining a device address for a target stackable memory device in a stackable memory device system;

determining a dedicated output pin of a controller corresponding to the target stackable memory device;
   generating, corresponding to the device address, a chip select signal in the controller;
   transmitting, through the dedicated output pin, the chip select signal through a cascade routing scheme of a first stackable memory device, the cascade routing scheme configured to shift the chip select signal from a set of input pins by one bit when propagated to a set of output pins; and
   activating, upon receipt of the chip select signal after passing through the first stackable memory device, an enable component of the target stackable memory device.

16. The method of claim 15, comprising:
   buffering the chip select signal to maintain signal integrity of the chip select signal as the chip select signal propagates from the set of input pins to the set of output pins.

17. The method of claim 15, comprising:
   verifying a successful activation of the target stackable memory device; and
   deactivating the target stackable memory device upon a completion of a memory access operation.

18. The method of claim 15, comprising:
   transmitting, through a control and address multidrop bus, a memory access command;
   transmitting, through a data query multidrop bus, data; and
   synchronizing the chip select signal with the memory access command.

19. The method of claim 15, wherein the chip select signal is generated from a computer processing unit or a graphics processing unit.

20. The method of claim 15, wherein activating an enable component of the target stackable memory device includes:
   receiving, through a set of input pins of the target stackable memory device, the chip select signal at the target stackable memory device;
   transmitting, through an enable point-to-point signal path configured to connect a first input pin to an enable component of the target stackable memory device; and
   activating a memory access operation on the target stackable memory device.

* * * * *